US006576160B1

United States Patent
Eichler et al.

(10) Patent No.: US 6,576,160 B1
(45) Date of Patent: Jun. 10, 2003

(54) SURFACE-MODIFIED FILLING MATERIAL COMPOSITION

(76) Inventors: Hans-Jurgen Eichler, Im Broich 17, Elsdorf (DE), D-50189; Michael Palmer, Leipziger Strasse 2, Bergheim (DE), D-50126; Rene Herbiet, Stendrich 150, Eupen (BE), B-4700

( * ) Notice: Subject to any disclaimer, the term of this patent is extended or adjusted under 35 U.S.C. 154(b) by 0 days.

(21) Appl. No.: 09/786,863

(22) PCT Filed: Sep. 14, 1999

(86) PCT No.: PCT/EP99/06809

§ 371 (c)(1),
(2), (4) Date: Jun. 27, 2001

(87) PCT Pub. No.: WO00/15710

PCT Pub. Date: Mar. 23, 2000

(65) Prior Publication Data (65)

(30) Foreign Application Priority Data

Sep. 14, 1998 (EP) .............................. 98117342

(51) Int. Cl.[7] .............................. C09K 21/00
(52) U.S. Cl. ...................... 252/609; 523/209
(58) Field of Search ........................ 252/609; 523/209

(56) References Cited

U.S. PATENT DOCUMENTS

| 4,151,154 | A | * | 4/1979 | Berger | ..................... 428/405 |
| 4,525,494 | A | | 6/1985 | Andy | |
| 4,853,154 | A | | 8/1989 | Icenogle et al. | |
| 4,859,366 | A | | 8/1989 | Djiauw et al. | |
| 5,338,777 | A | * | 8/1994 | Tarquini | ..................... 523/212 |
| 6,124,235 | A | * | 9/2000 | Letoffe et al. | ..................... 502/349 |

FOREIGN PATENT DOCUMENTS

| CA | 2028969 | * | 5/1991 |
| DE | 2743682 | | 3/1978 |
| DE | 2659933 | | 1/1980 |
| EP | 0227139 | | 11/1986 |
| EP | A-0292233 | | 11/1988 |
| EP | A-0436196 | | 7/1991 |
| WO | WO 96/26240 | | 8/1996 |

OTHER PUBLICATIONS

KEN–REACT Reference Manual, KR 0395, Title Page, Table of Contents, and Pages 1 to 29 Date Unknown.

Hüls AG Marl, "Lieferprogramme Silane–Kieselsäureester–Metallsäureester, chelate" Feb. 1994.

* cited by examiner

Primary Examiner—Cephia D. Toomer
(74) Attorney, Agent, or Firm—Fisher, Christen & Sabol

(57) ABSTRACT

Surface-modified filling material composition for thermoplastic, duroplastic or elastomeric materials, which is a halogen-free, flame-retardant filling material. The filling material is surface-treated with organotitanates and/or with organozirconates and with a siloxane derivative.

34 Claims, No Drawings

SURFACE-MODIFIED FILLING MATERIAL COMPOSITION

This is a 371 national stage application of PCT/EP99/06809, filed on Sep. 14, 1999, which has benefit of European Patent Application 98117342.0, filed on Sep. 14, 1998.

BACKGROUND OF THE INVENTION

1. Field of the Invention

The invention relates to a surface-modified filler composition, its use for fireproof finishing of thermoplastic, duroplastic or elastomeric plastics, and the fireproof plastics produced therefrom.

2. Background Art

Flame-retardant fillers, such as, e.g., magnesium hydroxide or aluminum hydroxide, are often surface-modified for the purpose of improving the characteristics profile of the plastic mixtures that are produced with these fillers. This could be done with, e.g., salts of fatty acids according to DE-A-26 59 933, with polymers containing acid groups according to EP-A-292 233, with ethylene-propylene-copolymers EPDM or ethylene-propylene-terpolymers and other additives according to EP-B-0 426 196 or with special fatty acid derivatives according to WO-A-96/26240.

A drawback of the coatings of the prior art is the lack of universality. Thus, e.g., in coatings according to WO-A-96/26240, the effect with respect to the improvement of mechanical properties and/or the burning properties is very clearly pronounced in some plastics, such as, e.g., in EVA, but virtually does not occur in other systems, such as, e.g., in aliphatic polyketones, either only conditionally or in plastics such as, e.g., polyamides.

BROAD DESCRIPTION OF THE INVENTION

The object was consequently to develop surface-modified filler compositions that do not contain the drawbacks of the prior art, and thus can be used universally in the case of improved polymer compatibility and show improved mechanical and rheological properties and/or improved burning properties in comparison to the uncoated filler. In particular, the object was to develop surface-modified filler compositions that are especially suitable for the production of compounds for cable insulation.

The object can be achieved with the surface-modified filler compositions according to the invention.

According to the invention, the surface-modification of the halogen-free flame-retardant filler consists of one or more organotitanates and/or organozirconates and a siloxane derivative.

As halogen-free flame-retardant fillers, hydroxides of aluminum and/or hydroxides of magnesium, optionally mixed with oxides of aluminum, magnesium, titanium, silicon or zirconium or with other filler materials, such as, e.g., calcium carbonate, talc or calcined or non-calcined clays, are used.

Suitable hydroxides of aluminum are, e.g., natural Al(OH)$_3$-containing materials, such as, e.g., hydrargillite or gibbsite, (AlO(OH)$_x$)-containing materials, such as, e.g., boehmite or synthetic aluminum hydroxides, as they are marketed, e.g., under the trademark MARTIFIN® or MARTINAL® of the Alusuisse Martinswerk GmbH in Bergheim (Germany).

Suitable hydroxides of the magnesium are, e.g., natural Mg(OH)$_2$ types, such as, e.g., the brucite or sea water types, natural magnesium hydroxycarbonates, such as, e.g., dawsonite, huntite or hydromagnesite, or synthetic magnesium hydroxides, as are marketed, e.g., under the trademarks MAGNIFIN® of the Magnifin GmbH in Breitenau (Austria). As oxides of aluminum, magnesium, titanium or zirconium, the commercial oxides can be used. Depending on the required characteristics profile in the plastic, a hydroxide of aluminum and/or a hydroxide of magnesium by itself or in any mixture ratio is used with the above-mentioned oxides.

According to an embodiment of the invention, the filler composition in addition can contain a melamine derivative and/or a guanamine derivative. These additives can contribute to a further improvement of the flameproofing.

Suitable derivatives of the melamine are, e.g., melamine cyanurate/melaminisocyanurate or melaminediborate. A suitable derivative of guanamine is, e.g., acetoguanamine cyanurate.

For the purpose of better application, the melamine derivative and/or guanamine derivative can be taken up in a suitable vehicle. Such vehicles can be selected from polymers whose melting points are as much as possible below 150° C., from a suitable highly volatile organic solvent, which can be removed in further processing by evaporation, or from the organotitanates and/or organozirconates and a siloxane derivative that are used according to the invention.

The melamine derivative and/or guanamine derivative is suitably used in an amount of 0.01 to 25 parts, preferably 0.5 to 15 parts per 100 parts of halogen-free flame-retardant filler.

Suitable organotitanates and/or organozirconates are, e.g., those as described in the company publication "Ken-React Reference Manual," Bulletin KR-1084-2 of the Kenrich Petrochemicals Inc; or as the are marketed by, e.g., the DuPont Company under the trade name TYZOR®.

Suitable organotitaniums or oragnozirconates are, for example:

Titanium tetra-2-ethylhexanoate, titanium tetrabutanolate, tetraisopropyl titanate, triethanolamine zirconate, tetra-n-propyl-zirconate, tetra-n-butyl-zirconate, diethylcitrate chelate-zirconate, (triisosteary-isopropyl-titanate), tris-isooctadecanoato-O-titanium(IV)-2-propanolate, iscoctadecancato-O-2-propanolato-titanium(IV) bis-2-methyl-2-propanolate, tris(dodecyl)benzosulfonato-O-titanium(IV) 2-propanolate, tris(dioctyl)phosphato-O-titanium(IV) 2-propanolate, bis(dodecyl)benzosulfonato-O-2-propanolato-titanium (IV) (4-amino)benzenesulfonate, methoxydiglycolato-O-titanium(IV) tris(2-methyl)-2-propenoate, tris(dioctyl)pyrophosphato-O-titanium(IV) 2-propanolate, methoxydiglycolato-O-titanium(IV) tris(2-propenoate), tris(3,6-diaza)hexanolato-titanium(IV)-2-propanolate, oxoethylenediolato-titanium(IV) bis[4-(2-phenyl)-2-propyl-2]phenolate, titanium(IV) bis(dioctyl)pyrophosphato-O-oxcethylenediolate, adduct with (dioctyl-O-hydrogenphosphite), tris-(2-methyl)-2-propenoato-O-titanium(IV) oxoethylenediolate, titanium(IV) bis(butyl,methyl)pyrophosphato-O-oxoethylene-diolate, adduct with bis(dioctyl)-hydrogenphosphite, ethylenediolato-O-titanium(IV) bis (dioctyl)phosphate,
ethylenediolato-O-titanium(IV) bis (dioctyl) pyrophosphate, adduct with bis(dioctyl)-hydrogenphosphite,
ethylenediolato-O-titanium(IV) bis(butyl,methyl) pyrophosphate, adduct with bis(dioctyl)-hydrogenphosphite,
oxoethylenediolato-titanium(IV) bis(dioctyl) pyrophosphate, adduct with 2 mol of 2-N,N-dimethylamino-2-methylpropanol,
methylpyrophosphato-O-titanium(IV) bis(butyl), adduct with 2 mol of 2-N,N-dimethylamino-2-methylpropanol, bis(dioctyl)pyrophosphato-O-titanium(IV) ethylenediolate-bis-(triethyl)amine salt,
bis(dioctyl)pyrophosphato-O-bis(dialkyl)aminoalkyl-2-methylpropenoate-titanium(IV) ethylenediolate,
ethylenediolato-O-titanium(IV) bis(dioctyl) pyrophosphate, adduct with 2 mol of acrylato-O-amine,
ethylenediolato-O-titanium(IV) bis(dioctyl) pyrophosphate, adduct with 2 mol of 2-methylpropenoamido-N-amine,
methylpyrophosphato-ethylenediolato-titanium(IV) bis (butyl)-bis(dialkyl)aminoalkylacrylate salt,
bis(dioctyl)pyrophosphato-O-titanium(IV) (bis-2-propenolatemethyl)-2-butanolate, adduct with 3 mol of N,N-dimethylaminoalkylpropenoamide,
bis(dioctyl)pyrophosphato-O-zirconium(IV) 2,2-dimethyl-1,3-propanediolate, adduct with 2 mol of N,N-dimethylaminoalkylpropenoamide,
cyclo-bis-2-dimethylaminopyrophosphato-O,O-zirconium(IV) (2-ethyl, 2-propenolatomethyl)1,3-propanediolate, adduct with 2 mol of methanesulfonic acid,
titanium(IV) tetrakis-2-propanolate, adduct with 2 mol of (dioctyl)hydrogen phosphate,
titanium(IV) tetrakis octanolate, adduct with 2 mol of (ditridecyl)hydrogen phosphite,
methylbutanolato-titanium(IV) tetrakis(bis-2-propenolate), adduct with 2 mol of (di-tridecyl)-hydrogen phosphite,
zirconium(IV) tetrakis-2,2-(bis-2-propenolatomethyl) butanolate, adduct with 2 mol of ditridecyl hydrogen phosphite,
tris-neodecanolato-O-titanium(IV) 2,2-(bis-3-propenolatomethyl)butanolate,
tris(dodecyl)benzenesulfonato-O-titanium(IV) 2,2-(bis-2-propenolatomethyl)butanolate,
tris(dioctyl)phosphato-O-titanium(IV) 2,2-(bis-2-propenolatomethyl)butanolate,
tris(dioctyl)pyrophosphato-O-titanium(IV) 2,2-(bis-2-propenolatomethyl)butanolate,
tris(2-ethylenediamino ethylato-titanium(IV) 2,2-(bis-2-propenolatomethyl)butanolate,
tris(3-amino)-phenylato-titanium(IV) 2,2-(bis-2-propenolatomethyl)butanolate,
tris(6-hydroxy)hexanoato-O-titanium(IV) 2,2-(bis-2-propenolatomethyl)butanolate,
cyclo(dioctyl)pyrophosphato-O,O-titanium(IV) bis-octanolate,
titanium(IV) bis-cyclo(dioctyl)pyrophosphate,
cyclo-di-2,2-(bis-2-propenolatomethyl) butanolatopyrophosphato-O,O-zirconium(IV) 2-ethyl, 2-propenolatomethyl-1,3-propanediolate,
cyclo(di-2-ethylhexyl)pyrophosphato-zirconium(IV) to 2-ethylhexanolate,
tris-neodecanolato-O-zirconium(IV) 2,2-(bis-2-propenolatomethyl)butanolate,
tris(dodecyl)benzenesulfonato-O-zirconium(IV) 2,2-(bis-2-propenolatomethyl)butanolate,
tris(dioctyl)phosphato-O-zirconium(IV) 2,2-(bis-2-propenolatomethyl)butanolate, tris-2-methyl-2-propenolato-O-zirconium(IV) 2,2-(bis-2-propenolatomethyl)butanolate,
tris(dioctyl)pyrophosphato-O-zirconium(IV) 2,2-(bis-2-propenolatomethyl)butanolate,
tris-2-propenolato-O-zirconium(IV) 2,2-(bis-2-propenolato)butanolate,
tris(2-ethylenediamino)ethylato-zirconium(IV) 2,2-(bis-2-propenolatomethyl)butanolate,
bis-(9,10-11,12-diepoxy)octadecanoato-O-zirconium(IV) bis-(2,2-dimethyl-1,3-propanediolate, zirconium(IV) 2-ethyl-2-propenolatomethyl-1,3-propanediolate-bis-mercaptophenylate,
tris(2-amino)phenylato-zirconium(IV) 1,1-(bis-2-propenolatomethyl)butanolate.

These compounds can be used individually or as a mixture.

Preferred organotitanates and/or organozirconates are, e.g., titanium tetra-2-ethylhexanoate, tris-isooctadecanoato-O-titanium(IV)-2-propanolate, (triisostearyl isopropyl titanate), titanium tetrabutanolate and tetraisopropyl titanate, triethanolamine zirconate, tetra-n-propyl zirconate, tetra-n-butyl zirconate and diethylcitrate chelate-zirconate.

The organotitanates and/or organozirconates are suitably used in an amount of 0.01 to 10 parts, preferably 0.1 to 5 parts per 100 parts of halogen-free flame-retardant filler.

For the purpose of optimizing the mechanical properties, such as, e.g., the tensile strength, the elongation at break, and the modulus of elasticity, the organotitanate and/or the organozirconate can be used in combination with a suitable silane.

Suitably those silanes are used as they are described in, e.g., DE-A-27 43 682 or are indicated from the company prospectus of Hüls AG Marl, "Lieferprogramme Silane-Kieselsäureester-Metallsäureester, -chelate [Delivery Programs of Silane-silicic Acid Ester-Metal Acid Esters, -Chelates]," February 1994. Vinylsilanes, such as, e.g., vinyltriethoxysilane or vinyltrimethoxysilane, aminosilanes, such as, e.g., N-methyl-3-aminopropyl-trimethoxysilane, methacrylic silanes, such as, e.g., (methacryloyloxypropyl)-trimethoxysilanes, epoxysilanes, such as, e.g., 3-glycidyloxypropyl-trimethoxysilane, or alkylsilanes, such as, e.g., propyltriethoxysilane, are preferably used.

A mixture of the above-mentioned silanes can optionally also be used.

The silane is usually used in an amount of 0.01 to 10 parts, preferably 0.5 to 5 parts per 100 parts of-halogen-free flame-retardant filler.

According to the invention, the halogen-free, flame-retardant filler is treated in addition with a siloxane derivative. A polysiloxane is suitably used as a siloxane derivative. Suitable polysiloxanes are the oligoalkylsiloxanes, the polydialkylsiloxanes, such as, e.g., the polydimethylsiloxane or polydiethylsiloxane, the polyalkylarylsiloxanes, such as, e.g., the polyphenylmethylsiloxane, or the polydiarylsiloxanes, such as, e.g., the polyphenylsiloxane. The above-mentioned siloxanes can be functionalized with reactive groups, such as, e.g., hydroxy, amino, vinyl, acryl, methacryl, carboxy or glycidyl.

High-molecular polydialkylsiloxanes, which optionally are modified with the above-mentioned functional groups, are preferably used.

Mixtures of the above-mentioned siloxane derivatives optionally can be used. The siloxane derivative is generally used in an amount of 0.01 to 20 parts, preferably 0.05 to 10 parts per 100 parts of halogen-free flame-retardant filler.

For surface-modification, the halogen-free, flame-retardant filler suitably in a suitable mixer, preferably in a mixer that makes possible high shearing forces, is provided with the above-mentioned co-agents. In this case, the addition times or intervals and the process temperatures can be adapted to the reactivity of the co-agents with the filler surface. It is also possible to feed to the mixer a premixture of the co-agents together with the halogen-free flame-retardant filler.

Advantageously, an additive concentrate, a so-called master batch, can also first be produced by only a partial amount of the filler being mixed with the co-agents in question according to the above-mentioned process in a mixer with high shearing forces. This so-called master batch can then be diluted in a simple way with a technically less expensive mixing device, e.g., at the customer's site, with the corresponding amount of additional filler, and can be processed into ready-to-use surface-modified filler.

The halogen-free, flame-retardant filler that is modified in this way can then be processed into a compound with the desired polymer according to standard methods. Compounding devices include commercial mixing devices, such as, e.g., single- or twin-screw kneaders, co-kneaders, closed mixers or an FCM (farrel continuous mixer).

The surface-treated, halogen-free, flame-retardant filler according to the invention is suitable for the fireproof finishing of thermoplasts, duroplasts or elastomers. From the series of thermoplasts, e.g., polyethylene and its copolymers, polypropylene, EVA and its copolymers, EEA and its copolymers, polyamide and its copolymers, aliphatic polyketones or polyesters are suitable. As elastomers, e.g., rubbers such as EPM, EPDM, SBR, chloroprene rubber and nitrile rubber are considered.

The content of surface-treated filler in the polymer matrix in question shifts depending on the desired degree of flame-retardancy, generally between 5 and 90% by weight, preferably between 20 to 70% by weight relative to the filled polymer.

The surface-treated, halogen-free flame-retardant fillers in the above-mentioned thermoplasts, especially in EVA, EEA, PE, PP, PA and aliphatic polyketones, are preferably used.

Depending on the required characteristics profile, the above-mentioned fillers can be mixed into one or more oxides of aluminum, magnesium, titanium, silicon or zirconium to control, e.g., abrasion behavior, hardness or weathering properties.

The above-mentioned filler-containing compounds can contain additional fiber-like reinforcing substances. The fiber substances include, for example, glass fibers, stone fibers, metal fibers, polycrystalline ceramic fibers, including monocrystals, so-called "whiskers," also all fibers that originate from synthetic polymers, such as, e.g., aramide, carbon, polyamide, polyacryl, polyester and polyethylene fibers.

If desired, the compounds can be provided with suitable pigments and/or dyes or with other application-specific additives or adjuvants.

EXAMPLES

The individual physical measuring methods that are presented in the examples below are based on the following standards and norms:

| | |
|---|---|
| Melt flow index (MFI) | DIN 53 735 |
| Tensile strength: | DIN 53 455 |
| Modulus of elasticity: | DIN 53 457 |
| Elongation at break: | DIN 53 455 |
| Impact resistance: | DIN 53 453 |
| Spec. insulation resistance: | DIN 53 482 |
| Lowest oxygen index (LOI) | ASTM D 28 63 |
| UL 94 | Burning properties according to the Standard of the Underwriter Laboratories |

Example 1

As filler, first 1000 g of uncoated MAGNIFIN® H5 (Magnifin GmbH, A-Breitenau) was coated with an average specific surface area according to BET of 5 $m^2/g$ in a high-speed heating-cooling mixer with 0.8% (8 g) of an organotitanate (titanium tetrabutanolate of DuPont) for 40 minutes. After the cooling process in a cooling mixer to almost 40° C., an additional coating with 0.2% (2 g) of a polysiloxane (SFR100 of General Electric) and 0.3% (3 g) of an aminosilane (N-methyl-3-aminopropyltrimethoxysilane of Hüls) was carried out until the discharge temperature of 65° C. into the cooling mixer was reached.

The coated filler was then mixed in a Buss co-kneader into EVA (Escorene Ultra UL00119 of EXXON) together with 0.3% Irganox 1010, so that the filler content was 60%. In comparison, the uncoated MAGNIFIN® H5 and the filler MAGNIFIN® H51V, coated only with an aminosilane, with the same filler content was also blended in. Table 1 shows the results with respect to the Theological, mechanical and electrical properties as well as the flameproofing.

TABLE 1

| | Fillers in EVA | | |
|---|---|---|---|
| Property | H5 Comparison | H51V Comparison | Invention |
| MFI 190° C./10 kg (g/10 minutes) | 0.9 | 0.8 | 2.6 |
| Tensile strength (MPa) | 11.5 | 13 | 13.1 |
| Elongation at break (%) | 100 | 176 | 412 |
| Spec. Resistance after 28 days at 50° C. (Ω cm) | $10^{11}$ | $10^{13}$ | $10^{14}$ |
| LOI (% of $O_2$) | 41 | 44 | 61 |

Example 2

As filler, 1000 g of uncoated MAGNIFIN® H5 (Magnifin GmbH, A-Breitenau) in a high-speed heating-cooling mixer was coated with 1.0% (10 g) of an organotitanate (titanium tetrabutanolate of DuPont) for 30 minutes. After the cooling process in a cooling mixer to almost 40° C., an additional coating was carried out at this temperature with 3.0% (30 g) of a polysiloxane (SFR100 of General Electric).

The coated filler was then mixed into a Buss co-kneader in an aliphatic polyketone (Carilon DP/R 1000-1000 of SHELL), so that the filler content was 30%. In comparison, the uncoated MAGNIFIN® H5 and the filler MAGNIFIN® H51V, coated only with an aminosilane, with the same filler content was also blended in. Table 2 shows the results with respect to the mechanical properties, the impact resistance and the flameproofing.

TABLE 2

| | Fillers in Aliphatic Polyketone | | |
|---|---|---|---|
| Property | H5 Comparison | H51V Comparison | Invention |
| E-Modulus (MPa) | 2501 | 2794 | 2498 |
| Tensile strength (MPa) | 41 | 56 | 42 |
| Elongation at break (%) | 3.0 | 6.4 | 30 |
| Impact resistance (kJ/m$^2$) | with rupture 20.8 | with rupture 72 | without rupture |
| UL94 V | V2 | not reached | V1 |
| LOI (% of O$_2$) | 30 | 30 | 32 |

Example 3

As filler, 1000 g of uncoated MAGNIFIN® H5 (Magnifin GmbH, A-Breitenau) in a high-speed heating-cooling mixer was coated with 0.5% (5 g) of an organotitanate (isopropyl triisostearoyl titanate of Ken-React) and 0.3% of an aminosilane (N-methyl-3-aminopropyl-trimethoxysilane of Hüls) for 10 minutes. After the cooling process in a cooling mixer to almost room temperature, an additional coating was carried out with 4.0% (40 g) of a polysiloxane (Baysilon MH15 of Bayer), which simultaneously acts as a vehicle for the melamine cyanurate (Plastisan B of 3 V, also 4.0%).

The coated filler was then mixed into a Buss co-kneader in PA 12 (Vestamid L1670 of HÜLS), so that the filler content was 60%. In comparison, the uncoated MAGNIFIN® H5 and the filler MAGNIFIN® H51V, coated only with an aminosilane, with the same filler content was also blended in. Table 3 shows the results with respect to the flameproofing.

TABLE 3

| Filler | PA + H5 Comparison | PA + H51V Comparison | Invention |
|---|---|---|---|
| LOI (% of O$_2$) | 48 | 43 | 62 |

Example 4

As filler, 1000 g of uncoated MAGNIFIN® H5 (Magnifin GmbH, A-Breitenau) in a high-speed heating-cooling mixer was coated with 1.5% (15 g) of an organotitanate (isopropyl triisostearoyl titanate of Ken-React) for 10 minutes. After the cooling process in a cooling mixer to almost room temperature, an additional coating was carried out with 0.5% (5 g) of a polysiloxane (Baysilon MH15 of Bayer).

The coated filler was then mixed into a Buss co-kneader in polypropylene (Novolen 3200 H of BASF), so that the filler content was 65%. In comparison, the uncoated MAGNIFIN® H5 with the same filler content was also blended in.

Table 4 shows the results with respect to the Theological and mechanical properties.

TABLE 4

| | Fillers in Polypropylene | |
|---|---|---|
| Property | H5 Comparison | Invention |
| MFI 230° C./5 kg (g/10 minutes) | not measurable | 8.1 |
| E-modulus (MPa) | 3295 | 1623 |
| Tensile strength (MPa) | 20.2 | 13.1 |
| Elongation at break (%) | 1.1 | 142 |
| Impact resistance (kJ/m$^2$) | with rupture | without rupture |

Example 5

As filler, first 1000 g of uncoated MARTINAL® OL-104/LE (Alusuisse Martinswerk GmbH, D-Bergheim) was coated with an average specific surface area according to BET of 4 m$^2$/g in a high-speed heating-cooling mixer with 1.0% (10 g) of an organotitanate (isopropyl triisostearoyl titanate of Ken-React) for 30 minutes. After the cooling process in a cooling mixer to almost 40° C., an additional coating with 0.5% (5 g) of a polysiloxane (AK 350 of Wacker) was carried out until the discharge temperature of 65° C. into the cooling mixer was reached.

The coated filler was then mixed in a Buss co-kneader into EVA (Escorene Ultra UL00119 of EXXON) together with 0.3% Irganox 1010, so that the filler content was 60%. In comparison, the uncoated MARTINAL® OL-104/LE and the filler MARTINAL® OL-104/I, coated only with an aminosilane, with the same filler content was also blended in. Table 5 shows the results with respect to the Theological and the mechanical properties. The advantage exists in the more favorable flow behavior (higher MFI) and the high elongation at break of 431% here.

TABLE 5

| | Fillers in EVA | | |
|---|---|---|---|
| Property | OL-104/LE Comparison | OL-104/I Comparison | Invention |
| MFI 190/10 (g/10 minutes) | 1.5 | 1.3 | 2.0 |
| Tensile strength (MPa) | 10.1 | 13.1 | 7.7 |
| Elongation at break (%) | 135 | 207 | 431 |

What is claimed is:

1. A surface-modified filler composition for thermoplastic, duroplastic or elastomeric plastics, comprising a halogen-free flame-retardant filler that has a surface-modification consisting of a member selected from the group consisting of (a) one or more organotitanates and one or more siloxane derivatives, (b) one or more organozirconates and one or more siloxane derivatives, and (c) a combination of (a) and (b).

2. A surface-modified filler composition for thermoplastic, duroplastic or elastometric plastics, comprising a halogen-free flame-retardant filler that has a surface-modifications of (A) a member of selected from the group consisting of (a) one or more organotitanates and one or more siloxane derivatives, (b) one or more organozirconates and one or more siloxane derivatives, and (c) a combination of (a) and (b), and (B) a member selected from the group consisting of (d) a melamine derivative, (e) a guanamine derivative, and (f) a combination of (d) and (e).

3. The filler composition according to claim 2, wherein the melamine derivative and/or the guanamine derivative is contained in an amount of 0.01 to 25 parts per 100 parts of halogen-free, flame retardant filler.

4. The filler composition according to claim 3, wherein the organotitanate and/or the organozirconate is contained in an amount of 0.01 to 10 parts per 100 parts of halogen-free, flame-retardant filler.

5. The filler composition according to claim 4, wherein the organotitanate and/or the organozirconate is contained in combination with a silane.

6. The filler composition according to claim 5, wherein the silane is contained in an amount of 0.01 to 10 parts per 100 parts of halogen-free, flame retardant filler.

7. The filler composition according to claim 6, wherein the siloxane derivative is present in an amount of 0.01 to 20 parts per 100 parts of halogen-free, flame-retardant filler.

8. The filler composition according to claim 7, wherein the halogen-free, flame-retardant filler is one or more hydroxides of aluminum and/or one or more hydroxides of magnesium.

9. A thermoplast, duroplast, or elastomer that contains a surface-modified filler composition according to claim 2.

10. A material selected from the group consisting of a thermoplast, a duroplast and an elastomer, which contains 5 to 90 weight percent of the halogen-free, flame-retardant filler according to claim 2.

11. The filler composition according to claim 1, wherein the organotitanate and/or the organozirconate is contained in an amount of 0.01 to 10 parts per 100 parts of halogen-free, flame-retardant filler.

12. The filler composition according to claim 1, wherein the organotitanate and/or the organozirconate is contained in combination with a silane.

13. The filler composition according to claim 12, wherein the silane is contained in an amount of 0.01 to 10 parts per 100 parts of halogen-free, flame-retardant filler.

14. The filler composition according to claim 1, wherein the siloxane derivative is present in an amount of 0.01 to 20 parts per 100 parts of halogen-free, flame retardant filler.

15. The filler composition according to claim 1, wherein the halogen-free, flame-retardant filler is one or more hydroxides of aluminum and/or one or more hydroxides of magnesium.

16. The filler composition according to claim 15, wherein the halogen-free, flame-retardant filler is one or more hydroxides of aluminum and/or one or more hydroxides of magnesium mixed with one or more oxides of aluminum, magnesium, titanium, silicon or zirconium or with other filler materials.

17. The filler composition according to claim 1, wherein the halogen-free, flame-retardant filler is one or more hydroxides of aluminum and/or one or more hydroxides of magnesium mixed with one or more oxides of aluminum, magnesium, titanium, silicon or zirconium or with other filler materials.

18. A process comprising incorporating 5 to 90 weight percent of the halogen-free flame retardant filler according to claim 1 into a thermoplast, a duroplast or an elastomer.

19. A material selected from the group consisting of a thermoplast, a duroplast or an elastomer, which contains 5 to 90 weight percent of the halogen-free, flame-retardant filler according to claim 1.

20. A thermoplast, duroplast, or elastomer that contains a surface-modified filler composition according to claim 1.

21. The filler composition according to claim 1, wherein the one or more organotitanates is selected from the group consisting of titanium tetra-2-ethylhexonoate, tris-isooctadecanoato-O-titanium(IV)-2-propanolate, triisostearyl isopropyl titanate, titanium tetrabutanolate and tetraisopropyl titanate.

22. The filler composition according to claim 1, wherein the one or more organozirconates is selected from the group consisting of triethanolamine zirconate, tetra-n-propyl zirconate, tetra-n-butyl zirconate and diethylcitrate chelate-zirconate.

23. The filler composition according to claim 12, wherein the silane is selected from the group consisting of vinyltriethoxysilane, vinyltrimethoxysilane, N-methyl-3-aminopropyl-trimethoxysilane, (methacryloyloxypropyl)-trimethoxsilane, 3-glycidyloxypropyl-trimethoxysilane and propyltriethoxysilane.

24. The filler composition according to claim 1, wherein the siloxane derivative is selected from the group consisting of polydimethylsiloxane, polydiethylsiloxane, polymethylsiloxane and polyphenylsiloxane.

25. The filler composition according to claim 1, wherein the siloxane derivative is functionalized with at least one reactive group selected from the group consisting of hydroxy, amino, vinyl, acryl, methacryl, carboxy and glycidyl.

26. The thermoplast, duroplast or elastomer according to claim 20, wherein thermoplasts are selected from the group consisting of polypropylene, EVA, EEA, polyamide and its copolymers, aliphatic polyketones and polyesters, or the elastomer is selected from the group consisting of EPM, EPDM, SBR, chloroprene rubber and nitrile rubber.

27. The filler composition according to claim 2, wherein the one or more organotitanate is selected from the group consisting of titanium tetra-2-ethylhexonate, tris-isooctadecanoato-O-titanium(IV)-2-propanolate, triisostearyl isopropyl titanate, titanium tetrabutanolate and tetraisopropyl titanate.

28. The filler composition according to claim 2, wherein the one or more organozirconate is selected from the group consisting of triethanolamine zirconate, tetra-n-propyl zirconate, tetra-n-butyl zirconate and diethylcitrate chelate-zirconate.

29. The filler composition according to claim 5, wherein the silane is selected from the group consisting of vinyltriethoxysilane, vinyltrimethoxysilane, N-methyl-3-aminopropyl-trimethoxysilane, (methacryloyloxypropyl)-trimethoxysilane, 3-glycidyloxypropyl-trimethyxysilane and propyltriethoxysilane.

30. The filler composition according to claim 2, wherein the melamine is selected from the group consisting of melamine-cyanurate/melaminisocyanurate and melamined-iborate.

31. The filler composition according to claim 2, wherein the guanamine is acetoguanamine cyanurate.

32. The filler composition according to claim 2, wherein the siloxane derivative is selected from the group consisting of polydimethylsiloxane, polydiethylsiloxane, polyphenylmethylsiloxane and polyphenylsiloxane.

33. The filler composition according to claim 2, wherein the siloxane derivative is functionalized with at least one reactive group selected from the group consisting of hydroxy, amino, vinyl, acryl, methacryl, carboxy and glycidyl.

34. The thermoplast, duroplast or elastomer according to claim 9, wherein the thermoplast is selected from the group consisting of polypropylene, EVA, EEA, polyamide and its copolymers, aliphatic polyketones and polyesters or the elastomer is selected from the group consisting of EPM, EPDM, SBR, chloroprene rubber and nitrile rubber.

* * * * *